United States Patent
Ogawa et al.

[11] Patent Number: 4,908,407
[45] Date of Patent: Mar. 13, 1990

[54] RESIN COMPOSITIONS

[75] Inventors: Yoshinari Ogawa, Sagamihara; Seiichi Yamashiro, Kodaira; Katsuhiko Hironaka, Sagamihara, all of Japan

[73] Assignee: Teijin Limited, Osaka, Japan

[21] Appl. No.: 311,371

[22] Filed: Feb. 14, 1989

Related U.S. Application Data

[63] Continuation of Ser. No. 74,265, Jul. 16, 1987, abandoned.

[30] Foreign Application Priority Data

Jul. 21, 1986 [JP] Japan .................................. 61-169870
Aug. 20, 1986 [JP] Japan .................................. 61-192914

[51] Int. Cl.$^4$ .......................... C08K 3/22; C08K 7/14; C08L 63/02
[52] U.S. Cl. .................................. 525/113; 523/435; 523/456; 523/457
[58] Field of Search ................ 525/113, 121; 523/435, 523/456, 457

[56] References Cited

U.S. PATENT DOCUMENTS

| | | | |
|---|---|---|---|
| 3,880,947 | 4/1975 | Labana et al. | 525/182 |
| 4,137,212 | 1/1979 | Theysohn et al. | 525/178 |
| 4,447,572 | 5/1984 | Scharf et al. | 525/183 |
| 4,665,225 | 5/1987 | Frihart | 528/327 |

*Primary Examiner*—Lewis T. Jacobs
*Assistant Examiner*—Robert E. L. Sellers, II
*Attorney, Agent, or Firm*—Burgess, Ryan and Wayne

[57] ABSTRACT

A resin composition comprising a nylon-4,6 resin, an epoxy compound having two epoxy groups and at least one polymer selected from halogenated polystyrenes and halogenated poly-alpha-methylstyrenes, represented by the following general formula (I)

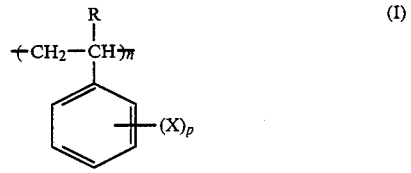

(wherein R is a hydrogen atom or a methyl group; X is a bromine or chlorine atom; p is an integer of 1 to 5; and n is an integer of 2 or more).

9 Claims, No Drawings

RESIN COMPOSITIONS

This application is a continuation of application Ser. No. 074,265, filed July 16, 1987, now abandoned.

BACKGROUND OF THE INVENTION (1) Field of the Invention

The present invention relates to a resin composition. More particularly, the present invention relates to a nylon-4,6 resin composition having excellent moldability and excellent heat stability.

(2) Description of the Related Art

Nylon-4,6 resins produced from a tetramethylenediamine or its functional derivative and adipic acid or its functional derivative are well known, and are believed to have a high utility value as an engineering plastic because they have superior mechanical strength (e.g., tensile strength, bending strength, impact strength), heat resistance, and sliding characteristics. Nylon-4,6 resins, however, have a serious drawback of poor moldability, making their utilization extremely difficult.

Generally the moldability of polymers, particularly plastics, is very important in the evaluation of plastics per se. Even if a plastic inherently possesses excellent properties, if it has a poor moldability, it is difficult to economically produce a molding therefrom, and moreover, it is impossible for the molding to satisfactorily retain the excellent properties of the plastic raw material.

The nylon-4,6 resins have a melting point of about 290° C. but decompose at about 320° C. or above, and accordingly, the temperature range in which the resins are moldable is very narrow.

Moreover, the melt viscosity of nylon-4,6 resins which are used as an ordinary molding material not only is extremely temperature-dependent but also is substantially reduced due to thermal decomposition during residence. Therefore, the flowability of these resins in the molten state can vary greatly, due to a minor change of molding temperature and residence time in the molten state, etc., making it very difficult to produce a stable mold thereof.

This instability of a melt during molding causes drooling during the molding, and the molding obtained has defects, such as short shot, sink, flow mark, flash, etc., and as a result, the molding has a poor appearance and remarkably reduced mechanical strengths.

WO No. 86/03214 discloses an improvement of the stability of nylon-4,6 during melt-molding by the addition thereto of at least one compound selected from the groups of aminosilanes, epoxysilanes and vinylsilanes. However, the resulting composition does not have sufficient heat stability during molding, and a further improvement is required.

SUMMARY OF THE INVENTION

The present invention has been completed in view of the above situation and is intended to improve the melt moldability of nylon-4,6 resin while maintaining the excellent characteristics thereof.

The present inventors made an extensive study into ways in which to improve the moldability of nylon-4,6 resin, and as a result, found that the addition to a nylon-4,6 resin of a small amount of an epoxy compound having two epoxy groups suppresses the reduction of the melt viscosity of the resin due to a thermal decomposition thereof and gives the resulting composition a stable melt viscosity during molding. However, this composition has a reduced melt flowability due to the presence of the epoxy compound. In the present invention, it was surprisingly found that the reduction of melt flowability in the above composition can be prevented by adding to such a composition a halogenated polystyrene or a halogenated poly-alpha-methylstyrene.

According to the present invention, there is provided a resin composition comprising (A) 100 parts by weight of a nylon-4,6 resin, (B) 0.1 to 3 parts by weight of an epoxy compound having two epoxy groups, and (C) 3 to 40 parts by weight of at least one polymer selected from halogenated polystyrenes and halogenated poly-alpha-methylstyrenes, represented by the following general formula (I)

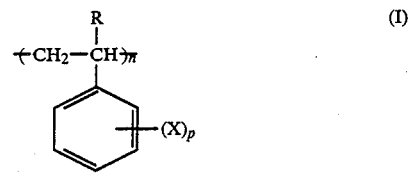

(wherein R is a hydrogen atom or a methyl group; X is a bromine or chlorine atom; p is an integer of 1 to 5; and n is an integer of 2 or more).

The resin composition according to the present invention has an excellent melt moldability and can be molded at lower temperatures. As a result, there is obtained a synergistic effect whereby the thermal decomposition of the resin is controlled at a low level. Moreover, since the halogenated styrene polymer represented by the general formula (I) has flame-retardancy properties, there can be provided, according to the present invention, a resin composition with an excellent flame retardancy, by allowing the resin composition of the present invention to further comprise a flame-retarding aid such as antimony trioxide.

DESCRIPTION OF THE PREFERRED EMBODIMENTS

The nylon-4,6 resin which is the component (A) of the composition of the present invention is primarily a polyamide obtained by condensing (a) adipic acid or its functional derivative as an acid component and (b) tetramethylenediamine or its functional derivative as an amine component, according to an ordinary method. The nylon-4,6 resin also may be a slightly modified product of the above polyamide wherein part of the adipic acid component or the tetramethylenediamine component is replaced by another copolymerizable component.

Preferably, the nylon-4,6 resin used in the present invention has an intrinsic viscosity of 0.80 to 2.50, particularly 1.10 to 2.00, when measured at 35° C. using m-cresol. When the intrinsic viscosity of the nylon-4,6 resin exceeds 2.50, the effect of the present invention due to addition of the epoxy compound is low; further, when a reinforcing filler, etc., are used in the resin composition of the present invention, the wetting of the filler with the resin is insufficient, and thus the molding obtained has a greatly reduced surface gloss and large variations in the mechanical or thermal properties thereof. When the intrinsic viscosity of the nylon-4,6 resin is lower than 0.80, the resulting composition has low mechanical strengths, which causes problems in practical application.

The epoxy compound which is the component (B) of the present composition can be any epoxy compound as long as it has two epoxy groups in the molecule. Known epoxy ethers, known epoxy esters, etc., can be used. If the epoxy compound has only one epoxy group, the improvement effect according to the present invention can not be obtained. Polyepoxy compounds each having three epoxy groups also are not suitable, because the resulting compositions form a three-dimensional structure of the nylon-4,6 resin when melted, and as a result, the compositions have a poor flowability during molding and the moldings obtained have a poor appearance.

As the epoxy compound used in the present invention, there can be mentioned, for example, bisphenol type epoxy compounds, novolac type epoxy compounds, and aliphatic epoxy compounds. As particularly preferable examples of the epoxy compound, diglycidyl polyethers obtained by reacting bisphenol A with epichlorohydrin can be mentioned. In addition, diglycidyl ethers obtained by reacting an oligomer (a monomer to a decamer) or a glycol with epichlorohydrin, and diglycidyl esters obtained by reacting an aromatic dicarboxylic acid or an aliphatic dicarboxylic acid with epichlorohydrin can be mentioned. The amount of the epoxy compound used is 0.1 to 3 parts by weight per 100 parts by weight of the nylon-4,6 resin. When the amount is less than 0.1 part by weight, the effect of the present invention is low and practically negligible. When the amount exceeds 3 parts by weight, the addition effect will not increase and, further, the resulting composition contains lumps of a gel-like substance presumably caused by a crosslinking of the nylon-4,6 resin, and accordingly, has a poor melt flowability during molding.

The halogenated polystyrene or halogenated poly-alpha-methylstyrene represented by the general formula (I), which is the component (C) of the present composition, can be produced by polymerizing a halogenated styrene or a halogenated alpha-methylstyrene, or by halogenating a polystyrene or a poly-alpha-methylstyrene. The examples of the halogenated styrene polymer include those described in Japanese Unexamined Patent Publication (Kokai) No. 50-92346. The polymers may suitably have a molecular weight of 30,000 to 2,000,000, preferably 170,000 to 1,400,000. The polymer of the general formula (I) can include a vinyl compound as a comonomer. As the vinyl compound, there can be mentioned styrene, alpha-methylstyrene, etc. The comonomer may preferably be copolymerized in an amount of not more than 20 mol %. The addition amount of the halogenated polystyrene and/or the halogenated poly- alpha-methylstyrene, both represented by the general formula (I), is 3 to 40 parts by weight, preferably 8 to 25 parts by weight, per 100 parts by weight of the nylon-4,6 resin. When the addition amount is less than 3 parts by weight, the melt flowability of the resulting composition is not sufficiently improved. When the addition amount exceeds 40 parts by weight, the resulting composition does not sufficiently retain the excellent mechanical and thermal properties inherently possessed by the nylon-4,6 resin. The addition of the halogenated polystyrene and/or the halogenated poly-alpha-methylstyrene, both represented by the general formula (I), greatly contributes to the improvement of melt flowability and the reduction of the molding temperature of the resulting composition. As mentioned previously, it is necessary to mold the nylon-4,6 resin at temperatures of about 300° C. or above, but since the molding temperature is close to the thermal decomposition temperature of the nylon-4,6 resin, the molding temperature range must be very narrow (between 300° C. and 320° C.) in order to utilize the excellent characteristics of the nylon-4,6 resin. The addition to the nylon-4,6 resin of the halogenated polystyrene and/or the halogenated poly-alpha-methylstyrene, both represented by the general formula (I), improves the reduction of the melt flowability of the nylon-4,6 resin during molding, and accordingly, enables molding at lower temperatures. The extent of the reduction in the molding temperature of the present resin composition differs in accordance with the addition amount of the compound of the general formula (I). When the compound of the general formula (I) is added in an amount specified in the present invention, the resulting composition can be molded at a temperature lower by 5° to 30° C. than when the compound of the general formula (I) is not added. The molding temperature range can be widened from 295°–320° C. to, for example, 270°–320° C.

The polymer of the general formula (I) useful in the present invention also has flame retardancy properties. Namely, when the present resin composition further comprises antimony trioxide, the resulting resin composition has an excellent flame retardancy. In this case, preferably the antimony trioxide is added in a proportion of one antimony atom in the antimony trioxide per 2 to 5 halogen atoms in the polymer of the general formula (I). Namely, preferably the antimony trioxide is used in the present composition in an amount of 1 to 20 parts by weight per 100 parts by weight of the nylon-4,6 resin. Other flame-retarding aids also can be used in combination, such as antimony pentaoxide, sodium antimonate, boron oxide, zirconium oxide, iron oxide, and the like.

The resin composition of the present invention can furthermore comprise, as necessary, other additives in respective effective amounts. Such additives include a reinforcing filler to be added for an improvement of the heat deformation temperature and mechanical strengths (e.g., stiffness, impact strength), such as a fibrous substance (e.g., glass fiber, aramid fiber, carbon fiber, steel fiber, asbestos, ceramic fiber, calcium titanate whiskers, boron whiskers, and calcium metasilicate whiskers) or a powdery, granular or plate-like substance (e.g., mica, silica, talc, calcium carbonate, glass beads, glass flakes, clay, wollastonite, and feldspar). The additives can also include a heat stabilizer, a coloring agent, an anti-oxidant, a lubricant, an ultraviolet absorber, and an antistatic agent, etc. Moreover, the present composition can comprise small amounts of other thermoplastic resins (e.g., polystyrene, acrylic resin, polyethylene, polypropylene, fluoroplastic, other polyamide resins, polycarbonate resin, and polysulfone resin), a thermosetting resin (e.g., phenolic resin, melamine resin, unsaturated polyester resins, and silicon resin), etc..

In obtaining the resin composition of the present invention, any desired compounding method can be employed as long all of the components are mixed as uniformly as possible. These compounding methods include a method wherein all or part of the components is mixed and homogenized simultaneously or separately in a mixer such as a blender, a kneader, a roll, an extruder or the like; a method wherein part of the components is mixed simultaneously or separately in a mixer such as a blender, a kneader, a roll, an extruder or the like, and then the rest of the components is added and the whole amount is mixed and homogenized; and a method wherein the components are dry-blended, the resulting composition is melt-kneaded and homogenized in a heated extruder and then extruded in a thread form, and the threads are chopped into a desired length to obtain pellets. The molding composition thus produced is ordinarily kept in a dried state and fed into a hopper of a molding machine for use in molding. Alternatively, the components of the present resin composition can be dry-blended, directly fed into a hopper of a molding machine, and melt-kneaded in the molding machine The present invention will be described in more detail by way of Examples, which in no way limit the scope of the invention.

The various characteristics shown in the Examples were measured according to the following methods.

(1) Static strengths

Tensile strength: Measured according to ASTM D 638

Impact strength: Measured according to ASTM D 256 (with Izod notch)

(2) Burning property

Measured according to the test method specified in UL-94.

(3) Melt flowability (flow quantity: Q)

Measured according to JIS K 7210 (test method for flow property) using a Koka type flow tester manufactured by Shimadzu Corp., under the following conditions.

Test load: M=30 kgf, Measurement temperature: 300° C., Die diameter: $D_d=1$ mm, Die length: $D_1=10$ mm The flow quantity Q obtained in the above test method was a quantity (ml) of a sample which flows per one second under the above conditions. A larger flow quantity indicates a better flowability.

Prior to the measurement of flow quantity, a sample was preheated in the tester for a predetermined period. This preheating time, which is a time from the charging of the sample into the tester to the start of the measurement, was taken as a residence time. During the residence time, the resin composition sample was kept in a molten state at a measurement temperature The measurement was conducted for two cases: (a) 5 minutes residence time and (b) 15 minutes residence time. The larger the difference between the two flow quantities, the greater the thermal decomposition of the sample during the residence time and the lower its thermal stability.

(4) Intrinsic viscosity

Measured at 35° C. for a m-cresol solution using an Ostwald viscometer.

EXAMPLES 1 TO 6 AND COMPARATIVE EXAMPLES 1 to 8

In a tumbler were uniformly mixed a nylon-4,6 resin dried at 110° C. for 6 hours under a reduced pressure of 10 Torr and having an intrinsic viscosity of 1.67 (STANYL ® manufactured by DSM Co., Netherlands), a brominated polystyrene (Pyrocheck 68-PB manufactured by Fero Corporation, U.S.A.), antimony trioxide (Patox C manufactured by Nihon Seiko, Japan) and an epoxy compound of bisphenol A diglycidyl ether type (Epicoat ® 828 manufactured by Yuka Shell K.K., Japan), in the proportions shown in Table 1. Each mixture was then melt-kneaded using a vented extruder (screw diameter: 68 mm) at a cylinder temperature of 310° C. under vacuum. Each thread discharged from the die was cooled and chopped to obtain pellets for molding. Using a 5 ounce injection molder, the pellets were molded into test pieces for the measurement of characteristics under the following conditions. Cylinder temperature: 290° C. to 310° C.; injection pressure: 1000 kg/cm²; mold temperature: 60° C.; cooling time: 20 seconds; total cycle time: 40 seconds. The static strengths of these test pieces were then measured (the molded test pieces were stored in a desiccator containing a silica gel drying agent and were taken out of the desiccator immediately before the test). The melt flowabilities (flow quantity: Q) of the pellets were measured before molding. The results are shown in Table 1.

TABLE 1

| | Cylinder temperature of molding machine (°C.) | Formulation (parts by weight) | | | | Characteristics of molding | | | | | |
|---|---|---|---|---|---|---|---|---|---|---|---|
| | | Component (A) Nylon-4,6 resin | Component (B) Brominated polystyrene | Component (C) Antimony trioxide | Component (D) Epoxy compound | Flow quantity of pellets (ml/sec) Residence time | | Tensile strength (kg/cm²) | Impact strength (kg · cm/cm) | Burning property (thickness: 1/32″) | Remarks |
| | | | | | | 5 min | 15 min | | | | |
| Comparative Example 1 | 290 | 100 | 0 | 0 | 0 | $1.6 \times 10^{-1}$ | Above $2.4 \times 10^{-1}$ | — | — | — | Impossible to mold due to poor flowability. |
| Comparative Example 2 | 310 | 100 | 0 | 0 | 0 | $1.6 \times 10^{-1}$ | Above $2.4 \times 10^{-1}$ | 910 | 9 | HB | |
| Comparative Example 3 | 310 | 80 | 20 | 0 | 0 | $1.2 \times 10^{-1}$ | Above $2.4 \times 10^{-1}$ | 890 | 6 | V-2 | Drooling and flash appeared. |
| Comparative Example 4 | 310 | 94 | 0 | 6 | 0 | $1.4 \times 10^{-1}$ | Above $2.4 \times 10^{-1}$ | 950 | 7 | HB | |
| Comparative Example 5 | 310 | 100 | 0 | 0 | 0.5 | $7.2 \times 10^{-2}$ | $1.7 \times 10^{-1}$ | 1050 | 13 | HB | Difficult to mold due to poor flowability. |
| Comparative Example 6 | 290 | 74 | 20 | 6 | 0 | $1.0 \times 10^{-1}$ | Above $2.4 \times 10^{-1}$ | 920 | 5 | V-0 | |
| Comparative Example 7 | 310 | 74 | 20 | 6 | 0 | $1.0 \times 10^{-1}$ | Above $2.4 \times 10^{-1}$ | 850 | 3 | V-0 | Drooling and flash appeared. |
| Example 1 | | 90 | 10 | 0 | 0.5 | $4.8 \times 10^{-2}$ | $8.0 \times 10^{-2}$ | | | | |
| Example 2 | | 80 | 20 | 0 | 0.5 | $5.0 \times 10^{-2}$ | $8.5 \times 10^{-2}$ | | | | |
| Example 3 | 290 | 74 | 20 | 6 | 0.5 | $4.0 \times 10^{-2}$ | $7.2 \times 10^{-2}$ | 900 | 5 | V-0 | |
| Example 4 | 310 | 74 | 20 | 6 | 0.5 | $4.0 \times 10^{-2}$ | $7.2 \times 10^{-2}$ | 910 | 4 | V-0 | |
| Comparative Example 8 | 310 | 71 | 20 | 3 | 3 | Below $5.2 \times 10^{-3}$ | — | — | — | — | Impossible to measure characteristics of molding due to short shot and poor flowability. |
| Example 5 | 290 | 74 | 24 | 2 | 0.7 | $3.6 \times 10^{-2}$ | $8.0 \times 10^{-2}$ | 910 | 5 | V-0 | |
| Example 6 | 290 | 73 | 17 | 10 | 0.4 | $4.5 \times 10^{-2}$ | $0.9 \times 10^{-2}$ | 900 | 6 | V-0 | |

As appreciated from Table 1, with nylon-4,6 alone, the flow quantity Q for a 15 minutes residence time exceeded a measurement limit and the thermal stability Each resin composition showed a very stable flowability during molding and each molding had a glossy and flat surface.

TABLE 2

| | Cylinder temperature of molding machine (°C.) | Formulation (parts by weight) | | | | | Flow quantity of pellets (ml/sec) Residence time | | Tensile strength (kg/cm$^2$) | Impact strength (kg · cm/cm) | Burning property (thickness: 1/32") |
|---|---|---|---|---|---|---|---|---|---|---|---|
| | | Component (A) Nylon-4,6 resin | Component (B) Brominated polystyrene | Component (C) Antimony trioxide | Component (D) Epoxy compound | Glass fiber | 5 min | 15 min | | | |
| Example 7 | 290 | 48 | 18 | 4 | 0.5 | 30 | $2.3 \times 10^{-2}$ | $4.0 \times 10^{-2}$ | 1300 | 7 | V-0 |
| Example 8 | 290 | 56 | 10 | 4 | 0.4 | 30 | $2.5 \times 10^{-2}$ | $5.2 \times 10^{-2}$ | 1420 | 5 | V-0 |
| Example 9 | 290 | 52 | 14 | 4 | 0.5 | 30 | $2.2 \times 10^{-2}$ | $4.5 \times 10^{-2}$ | 1460 | 8 | V-0 |
| Example 10 | 290 | 63 | 17 | 5 | 0.6 | 15 | $3.4 \times 10^{-2}$ | $6.9 \times 10^{-2}$ | 1110 | 6 | V-0 | was insufficient (Comparative Example 1). The thermal stability of the nylon-4,6 was not improved by the addition of the brominated polystyrene; when antimony trioxide was further added to improve the burning property to V-0 in a thickness of 1/32", the resulting composition showed severe degradation due to residence, and consequently in high temperature (310° C.) molding, leakage (so-called drooling) of a molten resin from the nozzle tip of the molding machine as well as molding flash occurred (Comparative Examples 3, 4, 6 and 7).

An addition of the epoxy compound to the nylon-4,6 suppressed the latter's thermal decomposition due to residence, but the addition reduced the latter's flowability and made it difficult to mold the resulting composition (Comparative Example 5).

An addition of the epoxy compound and the brominated polystyrene to the nylon-4,6 improved the latter's thermal stability while maintaining the latter's good flowability (Examples 1 and 2).

A further addition of antimony trioxide improved the burning property to V-0 in a thickness of 1/32". The resulting composition, having good thermal stability and good flowability, produced a good molding at a molding temperature of 290° C. (Examples 3 and 4).

When the epoxy compound was added in too large an amount, the melt flowability of the pellets increased, and thus the resulting composition had a reduced flowability during molding and a satisfactory test piece could not be molded. When the brominated polystyrene was added, the resulting composition could not be molded at 290° C. (the cylinder temperature of the molding machine) because the resin was not completely melted at that temperature.

EXAMPLES 7 TO 10

A nylon-4,6 resin having an intrinsic viscosity of 1.54, a chopped strand cut glass fiber having a length of 3 mm, a brominated polystyrene, antimony trioxide, and an epoxy compound (Epicoat ® manufactured by Yuka Shell K.K.) in the proportions shown in Table 2 were subjected to melt kneading and extrusion under the same conditions as in Example 1, to obtain pellets. The pellets were then molded. The melt flowability of the pellets was measured and the characteristics of the moldings were also measured. The results are shown in Table 2.

EXAMPLE 11

59 parts by weight of a nylon-4,6 resin dried at 110° C. for 8 hours under vacuum and having an intrinsic viscosity of 1.50, 20 parts by weight of an aramid fiber having a fiber length of 1 mm (Technora ® manufactured by TEIJIN LTD., Japan), 16 parts by weight of a brominated polystyrene, 5 parts by weight of antimony trioxide, and 0.3 part by weight of diglycidyl terephthalate were melt-kneaded under the same conditions as in Example 1, to obtain pellets for molding. The pellets were molded into test pieces using a molding machine at the cylinder temperature of 290° C. There was no problem in molding and the molding surface had a very good gloss.

The flow quantity of the pellets and the characteristics of the molding were as follows.

Flow quantity of pellets
5 minutes residence time: $2.9 \times 10^{-2}$
10 minutes residence time: $5.5 \times 10^{-2}$
Characteristics of molding
Tensile strength: 1100 kg/cm$^2$
Impact strength: 16 kg.cm/cm
Burning property: V-0 for a thickness of 1/32"

We claim:

1. A resin composition comprising (A) 100 parts by weight of a nylon-4,6 resin, (B) 0.1 to 3 parts by weight of an epoxy compound having two epoxy groups and (C) 3 to 40 parts by weight of at least one polymer selected from halogenated polystyrenes and halogenated poly-alpha-methylstyrenes, represented by the following general formula (I)

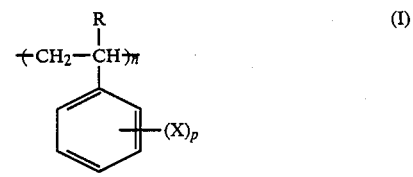

(wherein R is a hydrogen atom or a methyl group; X is a bromine or chlorine atom; p is an integer of 1 to 5; and n is an integer of 2 or more).

2. A resin composition according to claim 1, wherein the nylon-4,6 resin has an intrinsic viscosity of 0.80 to 2.50 when measured at 35° C. using m-cresol.

3. A resin composition according to claim 2, wherein the intrinsic viscosity is 1.10 to 2.00.

4. A resin composition according to claim 1, wherein the amount of the polymer represented by the general formula (I) is 8 to 25 parts by weight.

5. A resin composition according to claim 1, which can be subjected to melt molding at temperatures of 270° C. to 320° C.

6. A resin composition according to claim 1, which further comprises antimony trioxide.

7. A resin composition according to claim 6, wherein the amount of antimony trioxide is 1 to 20 parts by weight.

8. A resin composition according to claim 1, which further comprises a reinforcing filler.

9. A resin composition according to claim 8, wherein the reinforcing filler is selected from glass fibers, aramid fibers and potassium titanate whiskers.

* * * * *